(12) United States Patent
House et al.

(10) Patent No.: US 11,846,294 B1
(45) Date of Patent: Dec. 19, 2023

(54) BEARING HOUSING ASSEMBLY FOR A TURBOCHARGER

(71) Applicant: BorgWarner Inc., Auburn Hills, MI (US)

(72) Inventors: Timothy Mark House, Inman, SC (US); Augustine Cavagnaro, Flat Rock, NC (US); Zachary S. Ashton, Arden, NC (US); Kenneth Richard Bischof, Arden, NC (US)

(73) Assignee: BorgWarner Inc., Auburn Hills, MI (US)

( * ) Notice: Subject to any disclaimer, the term of this patent is extended or adjusted under 35 U.S.C. 154(b) by 0 days.

(21) Appl. No.: 17/752,340

(22) Filed: May 24, 2022

(51) Int. Cl.
*F04D 29/056* (2006.01)
*F02B 39/14* (2006.01)
*F04D 17/10* (2006.01)

(52) U.S. Cl.
CPC ............ *F04D 29/056* (2013.01); *F02B 39/14* (2013.01); *F04D 17/10* (2013.01)

(58) Field of Classification Search
CPC ........ F04D 29/056; F04D 17/10; F02B 39/14; F01D 25/16; F01D 25/162; F01D 25/164; F01D 25/166; F01D 25/18; F05D 2260/98; F05D 2220/40
See application file for complete search history.

(56) References Cited

U.S. PATENT DOCUMENTS

| | | | |
|---|---|---|---|
| 9,181,955 B1 | 11/2015 | House | |
| 9,581,044 B2 | 2/2017 | House et al. | |
| 10,316,742 B2 | 6/2019 | Hettinger et al. | |
| 11,067,131 B2 | 7/2021 | Colont et al. | |
| 2014/0086731 A1* | 3/2014 | Schmidt | F04D 29/056 415/170.1 |
| 2016/0298491 A1* | 10/2016 | Hettinger | F02C 6/12 |
| 2021/0054879 A1* | 2/2021 | Uneura | F01D 25/18 |

* cited by examiner

*Primary Examiner* — Loren C Edwards
(74) *Attorney, Agent, or Firm* — Howard & Howard Attorneys PLLC

(57) ABSTRACT

A bearing housing assembly includes a bearing housing and a bearing assembly. The housing extends along an axis and has a cross-bore surface defining a cross-bore to receive lubricant and a feed groove surface defining a feed groove. The feed groove surface has a constant radial portion extending circumferentially about a majority of the axis with a first groove radius that is constant and an expanded radial portion extending from the constant radial portion circumferentially about the axis with a second groove radius larger than the first groove radius. The bearing housing also has an interior surface having an interior radius smaller than the first groove radius and defining an interior. The bearing assembly is disposed in the interior and includes an outer race having a receiving groove surface defining a receiving groove, an inner race, and a rolling element disposed between the outer race and the inner race.

20 Claims, 4 Drawing Sheets

BEARING HOUSING ASSEMBLY FOR A TURBOCHARGER

BACKGROUND OF THE INVENTION

1. Field of the Invention

The invention generally relates to a bearing housing assembly for a turbocharger.

2. Description of the Related Art

Turbochargers receive exhaust gas from an internal combustion engine and deliver compressed air to the internal combustion engine. Turbochargers are used to increase power output of the internal combustion engine, lower fuel consumption of the internal combustion engine, and reduce emissions produced by the internal combustion engine. Delivery of compressed air to the internal combustion engine by the turbocharger allows the internal combustion engine to be smaller, yet able to develop the same or similar amount of horsepower as larger, naturally aspirated internal combustion engines. Having a smaller internal combustion engine for use with a vehicle reduces the mass and aerodynamic frontal area of the vehicle, which helps reduce fuel consumption of the internal combustion engine and improve fuel economy of the vehicle.

Typical turbochargers include a turbine housing defining a turbine housing interior, a turbine wheel disposed in the turbine housing interior for receiving exhaust gas from the internal combustion engine, and a shaft coupled to and rotatable by the turbine wheel. Typical turbochargers also include a compressor housing defining a compressor housing interior, and a compressor wheel disposed in the compressor housing interior and coupled to the shaft. The compressor wheel is rotatable by the shaft for delivering the compressed air to the internal combustion engine. Specifically, energy from the exhaust gas from the internal combustion engine, which would normally be wasted energy, is used to rotatably drive the turbine wheel, which is used to rotatably drive the shaft and, in turn, rotatably drive the compressor wheel to compress air and deliver compressed air to the internal combustion engine.

Typical turbochargers further include a bearing housing disposed between the compressor housing and the turbine housing and defining an interior, and a bearing assembly disposed in the interior to support rotation of the shaft. The bearing assemblies commonly include an outer race, an inner race, and a rolling element disposed between the outer race and the inner race. To ensure that the bearing assembly is able to adequately support rotation of the shaft, lubricant is commonly provided to the various components of the bearing assembly.

Commonly, lubricant is provided between the outer race and the bearing housing to form a thin film damper to provide damping to compensate for imbalance resulting from rotation of the turbine wheel, the shaft, and the compressor wheel. Moreover, lubricant is commonly provided to the rolling element to ensure smooth movement of the rolling element between the inner race and the outer race. However, thinner viscosity lubricants and lower lubricant pressures have been utilized in internal combustion engines to reduce losses of the internal combustion engine. As such, providing adequate lubricant to the rolling element while simultaneously ensuring formation of the thin film damper with thinner viscosity lubricants and lower lubricant pressures remains a difficulty.

Failure to provide adequate lubricant to the rolling element and failure to form the thin film damper results in high loads and repeated wear of various components of the turbocharger, such as on the rolling element, as well as high noise, vibration, and harshness (NVH) of the turbocharger. Repeated wear of various components of the turbocharger may also lead to functional failure of the turbocharger, particularly functional failure of the bearing assembly in supporting rotation of the shaft. Moreover, vibrations caused by high imbalance of the compressor wheel, the shaft, and the turbine wheel require dampening, which is unable to occur without adequate lubricant to form the thin film damper.

As such, there remains a need for an improved bearing assembly for a turbocharger.

SUMMARY OF THE INVENTION AND ADVANTAGES

A bearing housing assembly for a turbocharger includes a bearing housing extending along an axis and having a cross-bore surface extending along the axis and defining a cross-bore to receive a lubricant. The bearing housing also includes a feed groove surface defining a feed groove in fluid communication with the cross-bore. The feed groove surface has a constant radial portion extending circumferentially about a majority of the axis and having a first groove radius that is constant along the majority of the axis. The feed groove surface also has an expanded radial portion extending from the constant radial portion circumferentially about the axis and having a second groove radius larger than the first groove radius. Moreover, the bearing housing has an interior surface having an interior radius smaller than the first groove radius. The interior surface defines an interior in fluid communication with the feed groove.

The bearing housing assembly also includes a bearing assembly disposed in the interior of the bearing housing. The bearing assembly includes an outer race extending along the axis. The outer race has a receiving groove surface defining a receiving groove in fluid communication with the feed groove. The bearing assembly also includes an inner race spaced radially inwardly from the outer race, and a rolling element disposed between the outer race and the inner race.

The feed groove surface is able to provide adequate lubricant to the rolling element to ensure smooth movement of the rolling element between the inner race and the outer race, even if used in combination with thinner viscosity lubricants and lower lubricant pressures. More specifically, the overall geometry of the feed groove surface collectively established by the constant radial portion and the expanded radial portion enables both adequate amount of lubricant to be in the feed groove while simultaneously providing sufficient flow of lubricant to the rolling element. As such, high loads and repeated wear of the rolling element, inner race, and outer race are limited, thus also lowering noise, vibration, and harshness (NVH) of the bearing housing assembly. Moreover, functional failure of the bearing assembly is prevented because wear on the rolling element, the inner race, and the outer race is limited.

BRIEF DESCRIPTION OF THE DRAWINGS

Other advantages of the present invention will be readily appreciated, as the same becomes better understood by reference to the following detailed description when considered in connection with the accompanying drawings wherein.

DETAILED DESCRIPTION OF THE INVENTION

Figure 1:
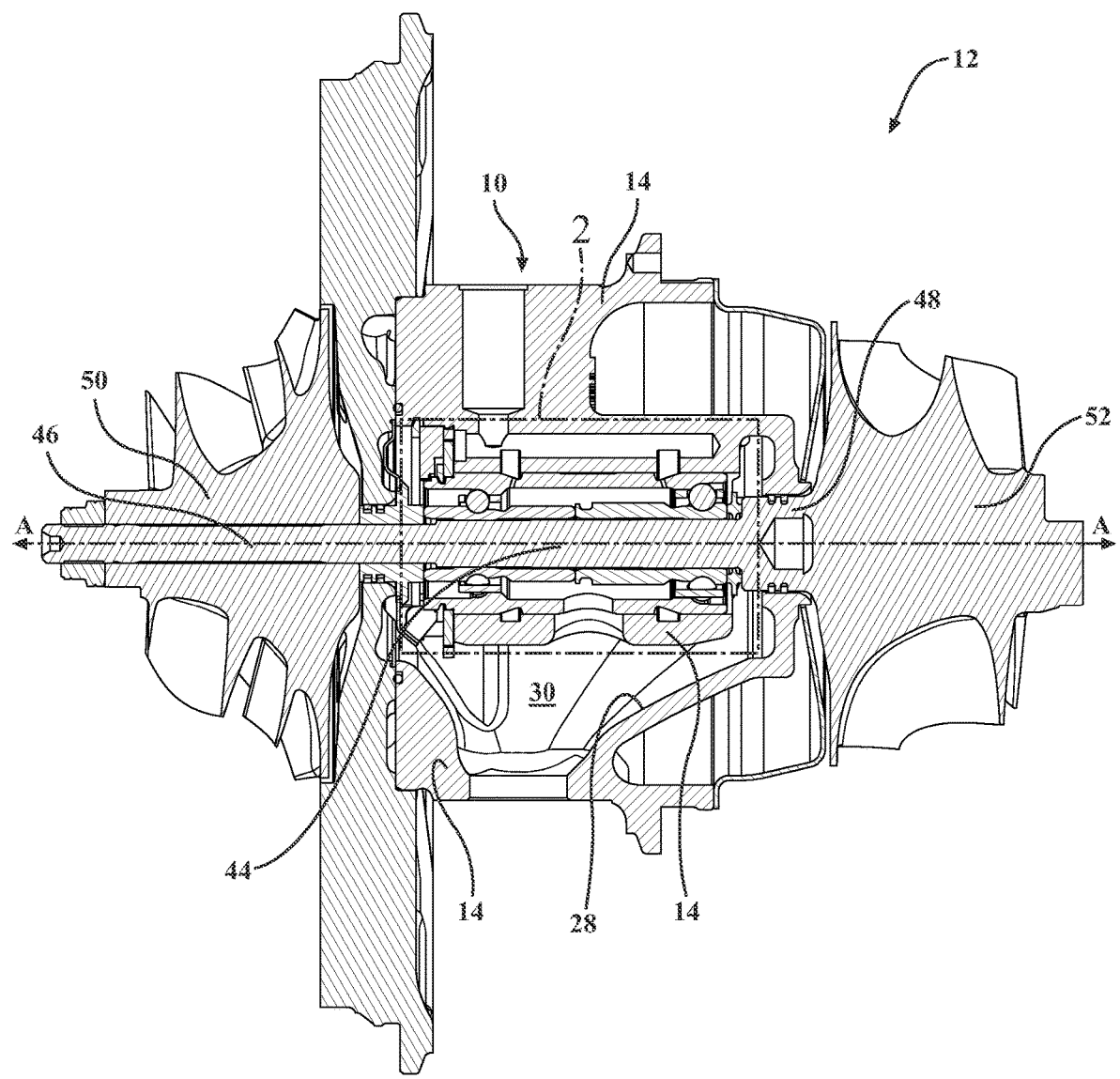
FIG. 1 is a cross-sectional view of a turbocharger including a bearing housing assembly, the bearing housing assembly including a bearing housing and a bearing assembly.

With reference to the Figures, wherein like numerals indicate like parts throughout the several views, a bearing housing assembly 10 for a turbocharger 12 includes a bearing housing 14 extending along an axis A and having a cross-bore surface 16 extending along the axis A and defining a cross-bore 18 to receive a lubricant. The bearing housing 14 also includes a feed groove surface 20 defining a feed groove 22 in fluid communication with the cross-bore 18. The feed groove surface 20 has a constant radial portion 24 extending circumferentially about a majority of the axis A and having a first groove radius GR1 from the axis A that is constant along the majority of the axis A. It is to be appreciated that extending circumferentially about the majority of the axis A results in extending circumferentially at least 50% about the axis A, or more than 180 degrees about the axis A. The feed groove surface 20 also has an expanded radial portion 26 extending from the constant radial portion 24 circumferentially about the axis A and having a second groove radius GR2 from the axis A larger than the first groove radius GR1 from the axis A. Moreover, the bearing housing 14 has an interior surface 28 having an interior radius IR from the axis A smaller than the first groove radius GR1 from the axis A. The interior surface 28 defines an interior 30 in fluid communication with the feed groove 22.

The bearing housing assembly 10 also includes a bearing assembly 32 disposed in the interior 30 of the bearing housing 14. The bearing assembly 32 includes an outer race 34 extending along the axis A. The outer race 34 has a receiving groove surface 36 defining a receiving groove 38 in fluid communication with the feed groove 22. The bearing assembly 32 also includes an inner race 40 spaced radially inwardly from the outer race 34, and a rolling element 42 disposed between the outer race 34 and the inner race 40. The rolling element 42 may be a ball bearing, a cylindrical bearing, or the like. The rolling element 42 may also be further defined as a plurality of rolling elements 42 spaced circumferentially from one another about the axis A.

The feed groove surface 20 is able to provide adequate lubricant to the rolling element 42 to ensure smooth movement of the rolling element 42 between the inner race 40 and the outer race 34, even if used in combination with thinner viscosity lubricants and lower lubricant pressures. More specifically, the overall geometry of the feed groove surface 20 collectively established by the constant radial portion 24 and the expanded radial portion 26 enables both adequate amount of lubricant to be in the feed groove 22 while simultaneously providing sufficient flow of lubricant to the rolling element 42. As such, high loads and repeated wear of the rolling element 42, inner race 40, and outer race 34 are limited, thus also lowering noise, vibration, and harshness (NVH) of the bearing housing assembly 10. Moreover, functional failure of the bearing assembly 32 is prevented because wear on the rolling element 42, the inner race 40, and the outer race 34 is limited.

It is to be appreciated that the bearing housing assembly 10 may be used in a turbocharger 12. The turbocharger 12 is for delivering compressed air to an internal combustion engine, and the turbocharger 12 includes a shaft 44 disposed in the inner race 40 of the bearing assembly 32 and extending along the axis A between a first shaft end portion 46 and a second shaft end portion 48 spaced from the first shaft end portion 46 along the axis A. The turbocharger 12 also includes a compressor wheel 50 coupled to the first shaft end portion 46 of the shaft 44. The turbocharger 12 further includes a turbine wheel 52 coupled to the second shaft end portion 48 of the shaft 44. The bearing assembly 32 supports rotation of the shaft 44.

Figure 2:
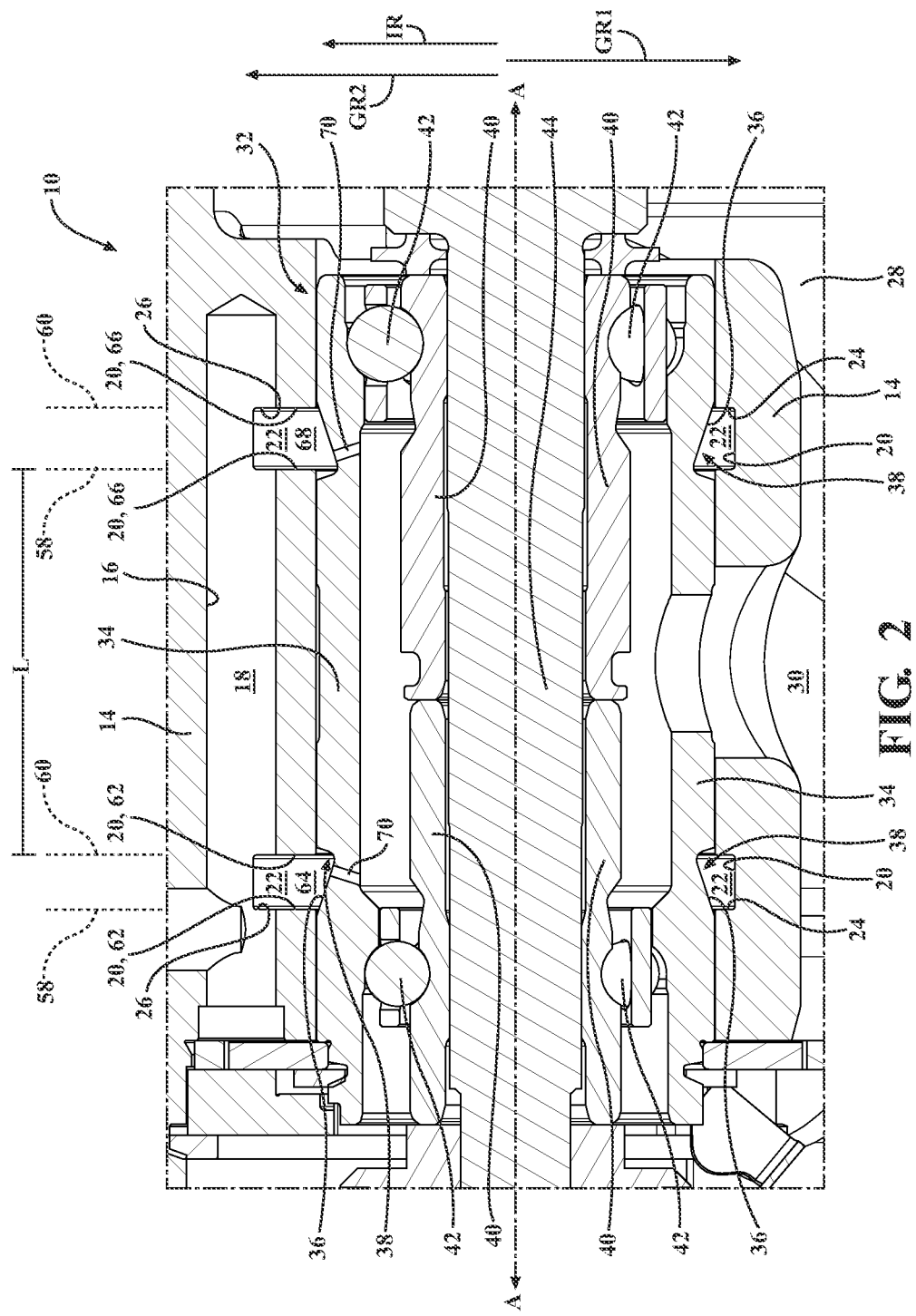
FIG. 2 is a cross-sectional view of the bearing assembly of FIG. 1, with the bearing assembly including an outer race, an inner race, and a rolling element.
Figure 3:
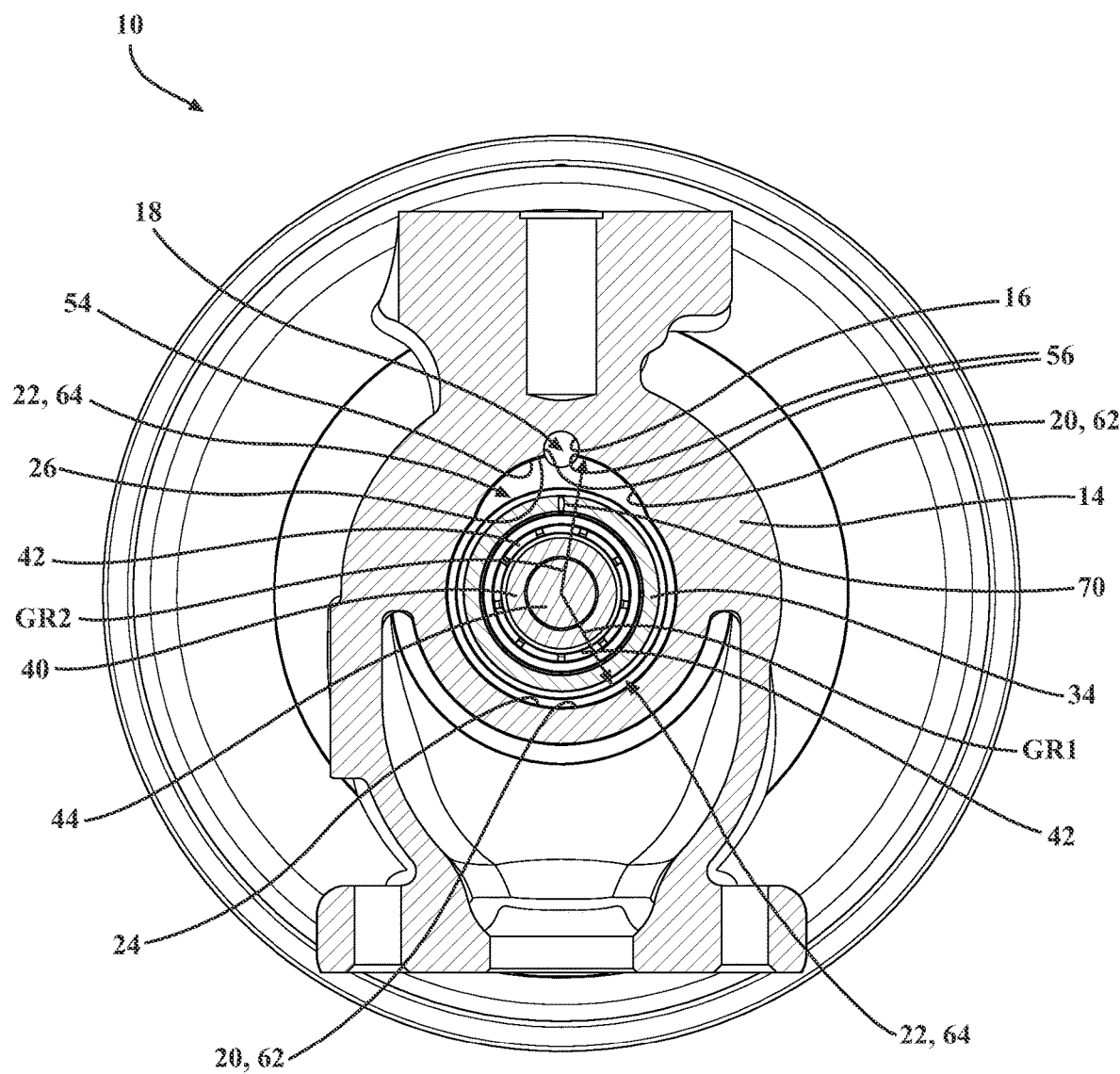
FIG. 3 is a partial cross-sectional view of the turbocharger of one embodiment, with the bearing housing of the turbocharger including a cross-bore surface defining a cross-bore, and a feed groove surface defining a feed groove and having a constant radial portion and an expanded radial portion.
Figure 4:
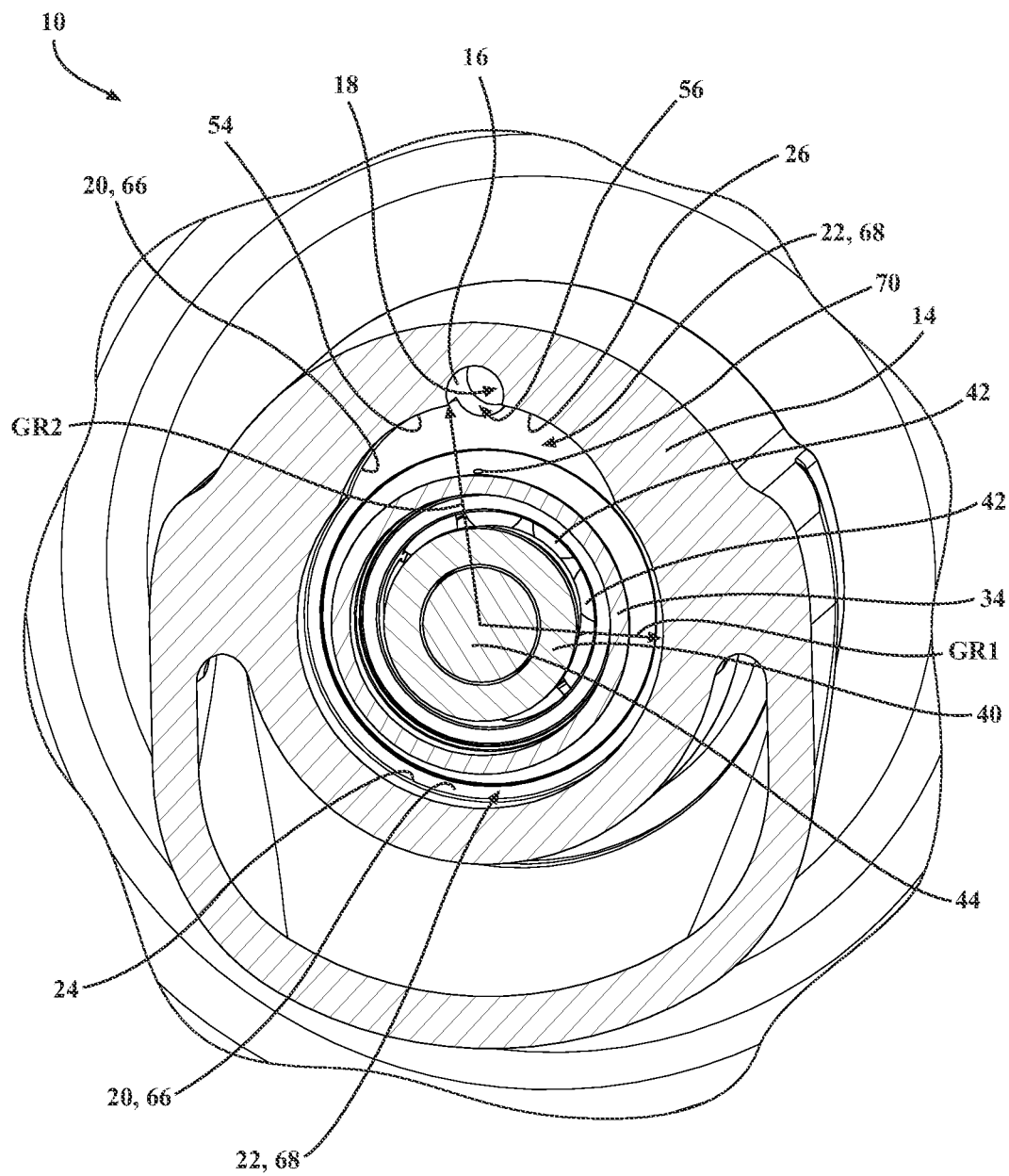
FIG. 4 is a partial cross-sectional view of the turbocharger of another embodiment, with the bearing housing of the turbocharger including the cross-bore surface defining the cross-bore, and a feed groove surface defining a feed groove and having a constant radial portion and an expanded radial portion.

As shown in FIGS. 2-4, the constant radial portion 24 of the feed groove surface 20 may be aligned with the expanded radial portion 26 of the feed groove surface 20 along the axis A. More specifically, the constant radial portion 24 of the feed groove surface 20 may axially overlap at least partially with the expanded radial portion 26 of the feed groove surface 20. Further, a majority of the constant radial portion 24 of the feed groove surface 20 may axially overlap with the expanded radial portion 26 of the feed groove surface 20. It is to be appreciated that the majority of the constant radial portion 24 axially overlapping with the expanded radial portion 26 results at least 50% of the axial length of the constant radial portion 24 axially overlapping the expanded radial portion 26. It is to be appreciated that the constant radial portion 24 of the feed groove surface 20 may have the same axial width as the expanded radial portion 26 of the feed groove surface 20. In other words, the constant radial portion 24 of the feed groove surface 20 may extend from a first axial location to a second axial location, and the expanded radial portion 26 of the feed groove surface 20 may extend from the first axial location to the second axial location. Axial overlap between the constant radial portion 24 and expanded radial portion 26 increases a rate at which lubricant may be transferred from one to the other, particularly from the expanded radial portion 26 to the constant radial portion 24, thus ensuring consistent supply of lubricant to both the expanded radial portion 26 and the constant radial portion 24 of the feed groove surface 20.

Although not required, the expanded radial portion 26 of the feed groove surface 20 is shaped as a lobe 54. The lobe 54 may take the shape of, in a non-limiting example, the lobe of a camshaft. It is to be appreciated, however, that the expanded radial portion 26 of the feed groove surface 20 may be a variety of shapes, including but not limited to, oval or polygonal. It is also to be appreciated that the expanded radial portion 26 may be symmetric or asymmetric. Further, when viewed with the constant radial portion 24 of the feed groove surface 20, the feed groove surface 20 may be seen as egg-shaped or keyhole shaped. Moreover, the lobe 54 may function as a reservoir to hold a volume of lubricant. It is also to be appreciated that the lobe 54 may extend radially about its own axis offset from the axis A along with the bearing housing 10 extends.

The lobe 54 has an apex 56. The cross-bore 18 defined by the cross-bore surface 16 may be defined at least partially through the apex 56 of the lobe 54, as shown in FIGS. 3 and 4. The cross-bore 18 defined by the cross-bore surface 16 being defined at least partially through the apex 56 of the lobe 54 ensures consistent supply of lubricant to the expanded radial portion 26 of the feed groove surface 20.

The receiving groove surface 36 may be aligned with the feed groove surface along the axis A. More specifically, the receiving groove surface 36 may extend between a first axial location 58 and a second axial location 60 spaced from the first axial location 58 along the axis A, and the feed groove surface 20 may be disposed at least partially between the first axial location 58 and the second axial location 60. It is to be appreciated that a majority of the feed groove surface 20 may be disposed between the first axial location 58 and the second axial location 60. It is to be appreciated the majority of the feed groove surface 20 being disposed between the first axial location 58 and the second axial location 60 results in at least 50% of the length of the feed groove surface 20 being between the first axial location 58 and the second axial location 60. It is also to be appreciated that the feed groove surface 20 may be disposed completely between the first axial location 58 and the second axial location 60. Axial overlap between the feed groove surface 20 and the receiving groove surface 36 increases a rate at which lubricant may be transferred from one to the other, particularly from the feed groove surface 20 to the receiving groove surface 36, thus ensuring consistent supply of lubricant to the receiving groove surface 36.

As shown in FIGS. 1 and 2, the feed groove surface 20 may be further defined as a first feed groove surface 62 defining a first feed groove 64. The bearing housing assembly 10 may also include a second feed groove surface 66 defining a second feed groove 68 in fluid communication with the cross-bore 18. The second feed groove surface 66 may have a constant radial portion 24 extending circumferentially about a majority of the axis A and having a first groove radius GR1 from the axis A that is constant along the majority of the axis A. It is to be appreciated that extending circumferentially about the majority of the axis A results in extending circumferentially at least 50% about the axis A, or more than 180 degrees about the axis A. The second feed groove surface 66 may also have an expanded radial portion 26 extending from the constant radial portion 24 circumferentially about the axis A and having a second groove radius GR2 larger than the first groove radius GR1 from the axis A. The first feed groove surface 62 is shown in FIG. 3, and the second feed groove surface 66 is shown in FIG. 4.

Although not required, the interior radius IR of the interior surface 28 of the bearing housing 14 may be constant between the expanded radial portions 26, 26 of the first feed groove surface 62 and the second feed groove surface 66. Additionally, the interior surface 28 of the bearing housing 14 and the outer race 34 of the bearing assembly 32 may be together configured to establish a thin film damper of the lubricant along a majority of a length L between the expanded radial portions 26, 26 of the first feed groove surface 62 and the second feed groove surface 66. It is to be appreciated that the thin film damper of lubricant being established along a majority of the length L results in the thin film damper of lubricant being established at least 50% of the length L along the axis A. Moreover, the constant radial portion 24 of the feed groove surface 20 may be configured to direct lubricant between the interior surface 28 of the bearing housing 14 and the outer race 34 of the bearing assembly 32 and establish the thin film damper of lubricant therebetween. As such, lubricant may flow through the cross-bore 18 to the expanded radial portion 26 of the feed groove 22, from the expanded radial portion 26 of the feed groove 22 to the constant radial portion 24 of the feed groove 22, and from the constant radial portion 24 of the feed groove 22 to between the interior surface 28 and the outer race 34 to establish the thin film damper. It is also to be appreciated that the thin film damper of the lubricant may also be established outboard of the first feed groove surface 62 and the second feed groove surface 66.

The interior radius IR of the interior surface 28 of the bearing housing 14 being constant between the expanded radial portions 26, 26 of the first feed groove surface 62 and the second feed groove surface 66 results in ease of manufacture of the interior surface 28 of the bearing housing 14. However, in the embodiments where the interior surface 28 of the bearing housing 14 and the outer race 34 of the bearing assembly 32 are together configured to establish the thin film damper of the lubricant along a majority of a length L between the expanded radial portions 26, 26 of the first feed groove surface 62 and the second feed groove surface 66, having the interior radius IR of the interior surface 28 of the bearing housing 14 being constant between the expanded radial portions 26, 26 results in the thin film damper being more difficult to consistently form. As such, the constant radial portion 24 of the feed groove surface 20 being configured to direct lubricant between the interior surface 28 and the outer race 34 and establish the thin film damper of lubricant therebetween allows both ease of manufacture of the interior surface 28 of the bearing housing 14 while also still ensuring a consistent supply of lubricant to establish the thin film damper. Consistent supply of lubricant to establish the thin film damper ensures damping to compensate for imbalance that may result from rotation of the compressor wheel 50, the shaft 44, and the turbine wheel 52 about the axis A.

Additionally, as shown in FIG. 2, the receiving groove surface 36 may be tilted, or angularly offset, relative to the axis A. As detailed above, the receiving groove 38 defined by the receiving groove surface 36 is in fluid communication with the feed groove 22 defined by the feed groove surface 20 such that lubricant may flow from the feed groove 22 to the receiving groove 38. The receiving groove surface 36 of the outer race 34 may further define a lubricant jet 70 to direct lubricant from the receiving groove 38 through the outer race 34 toward the rolling element 42. More specifically, as show in FIG. 2, the lubricant jet 70 may be defined perpendicular to the receiving groove surface 36. As such, lubricant may flow through the cross-bore 18 to the feed groove 22, from the feed groove 22 to the receiving groove 38, from the receiving groove 38 through the lubricant jet 70, and from the lubricant jet 70 toward the rolling element 42 to lubricate the rolling element 42.

More specifically, the lubricant jet 70 may be aligned with the expanded radial portion 26 of the feed groove surface 20 circumferentially about the axis A, as shown in FIGS. 3 and 4. As such, lubricant may flow through the cross-bore 18 to the portion of the feed groove 22 defined by the expanded radial portion 26 of the feed groove surface 20, and from the portion of the feed groove 22 defined by the expanded radial portion 26 of the feed groove surface 20 through the lubricant jet 70 to the rolling element 42. The expanded radial portion 26 of the feed groove surface 20 results in the portion of the feed groove 22 defined by the expanded radial portion 26 of the feed groove surface 20 being able to hold a greater volume of lubricant as compared to a similar circumferential section of the constant radial portion 24 of the feed groove surface 20. The greater volume of lubricant able to be held by the expanded radial portion 26 of the feed groove surface 20 ensures a consistent supply of lubricant to the lubricant jet 70, and thus also to the rolling element 42.

In the embodiments where the expanded radial portion 26 of the feed groove surface 20 is shaped as the lobe 54 having the apex 56, the lubricant jet 70 may be aligned with the apex 56 circumferentially about the axis A, as shown in FIGS. 3 and 4. Alignment of the lubricant jet 70 with the apex 56 of the lobe 54 further ensures consistent supply of lubricant through the lubricant jet 70 and to the rolling element 42, particularly in the embodiments where the cross-bore 18 is defined at least partially through the apex 56 of the lobe 54. The expanded radial portion 26 of the feed groove surface 20 may be aligned with the cross-bore surface 16 circumferentially about the axis A, further ensuring consistent supply of lubricant through the lubricant jet 70.

The constant radial portion 24 of the feed groove surface 20 may be disposed circumferentially opposite to the cross-bore surface 16. In a non-limiting example, the lubricant may be fed by gravity through the bearing housing assembly 10. In gravity-fed embodiments, the constant radial portion 24 may be fed by gravity with lubricant from the expanded radial portion 26. Moreover, the constant radial portion 24 of the feed groove surface 20 may not be aligned with (i.e., offset from) the cross-bore surface 16 circumferentially about the axis A, thus ensuring lubricant is fed from the cross-bore 18 to the expanded radial portion 26 before lubricant is fed to the constant radial portion 24. As a result, consistent lubrication is ensured to both the thin film damper and the rolling element 42 via the lubricant jet 70.

The invention has been described in an illustrative manner, and it is to be understood that the terminology which has been used is intended to be in the nature of words of description rather than of limitation. Many modifications and variations of the present invention are possible in light of the above teachings, and the invention may be practiced otherwise than as specifically described.

What is claimed is:

1. A bearing housing assembly for a turbocharger, said bearing housing assembly comprising:
   a bearing housing extending along an axis and having,
      a cross-bore surface extending along said axis and defining a cross-bore to receive a lubricant,
      a feed groove surface defining a feed groove in fluid communication with said cross-bore and having,
         a constant radial portion extending circumferentially about a majority of said axis and having a first groove radius that is constant along said majority of said axis, and
         an expanded radial portion extending from said constant radial portion circumferentially about said axis and having a second groove radius larger than said first groove radius, and
      an interior surface formed by the bearing housing and having an interior radius smaller than said first groove radius, with said interior surface defining an interior in fluid communication with said feed groove; and
   a bearing assembly disposed in said interior of said bearing housing, said bearing assembly including,
      an outer race extending along said axis and having a receiving groove surface defining a receiving groove in fluid communication with said feed groove; and
      an inner race spaced radially inwardly from said outer race; and
      a rolling element disposed between said outer race and said inner race.

2. The bearing housing assembly as set forth in claim 1, wherein said constant radial portion of said feed groove surface is aligned with said expanded radial portion of said feed groove surface along said axis.

3. The bearing housing assembly as set forth in claim 1, wherein said expanded radial portion of said feed groove surface is shaped as a lobe.

4. The bearing housing assembly as set forth in claim 3, wherein said lobe has an apex, and wherein said cross-bore is defined at least partially through said apex of said lobe.

5. The bearing housing assembly as set forth in claim 1, wherein said receiving groove surface is aligned with said feed groove surface along said axis.

6. The bearing housing assembly as set forth in claim 1, wherein said receiving groove surface extends between a first axial location and a second axial location spaced from said first axial location along said axis, and wherein said feed groove surface is disposed at least partially between said first axial location and said second axial location.

7. The bearing housing assembly as set forth in claim 6, wherein said feed groove surface is disposed completely between said first axial location and said second axial location.

8. The bearing housing assembly as set forth in claim 1, wherein said feed groove surface is further defined as a first feed groove surface defining a first feed groove, and said bearing housing further comprises a second feed groove surface defining a second feed groove in fluid communication with said cross-bore, with said second feed groove surface having,
   a constant radial portion extending circumferentially about the majority of said axis and having a first groove radius that is constant along said majority of said axis, and
   an expanded radial portion extending from said constant radial portion of said second feed groove surface circumferentially about said axis and having a second groove radius larger than said first groove radius of said second feed groove surface.

9. The bearing housing assembly as set forth in claim 8, wherein said interior radius of said interior surface of said bearing housing is constant between said expanded radial portion of said first feed groove surface and said expanded radial portion of said second feed groove surface.

10. The bearing housing assembly as set forth in claim 8, wherein said interior surface of said bearing housing and said outer race of said bearing assembly are together configured to establish a thin film damper of the lubricant along a majority of a length between said expanded radial portion of said first feed groove surface and said expanded radial portion of said second feed groove surface.

11. The bearing housing assembly as set forth in claim 1, wherein said constant radial portion of said feed groove surface is configured to direct lubricant between said interior surface of said bearing housing and said outer race of said bearing assembly and establish a thin film damper of lubricant therebetween.

12. The bearing housing assembly as set forth in claim 1, wherein said receiving groove surface is tilted relative to said axis.

13. The bearing housing assembly as set forth in claim 1, wherein said receiving groove surface of said outer race further defines a lubricant jet to direct lubricant from said receiving groove through said outer race toward said rolling element.

14. The bearing housing assembly as set forth in claim 13, wherein said lubricant jet is aligned with said expanded radial portion of said feed groove surface circumferentially about said axis.

15. The bearing housing assembly as set forth in claim 14, wherein said expanded radial portion of said feed groove surface is shaped as a lobe, wherein said lobe has an apex, and wherein said lubricant jet is aligned with said apex of said lobe circumferentially about said axis.

16. The bearing housing assembly as set forth in claim 13, wherein said lubricant jet is defined perpendicular to said receiving groove surface.

17. The bearing housing assembly as set forth in claim 1, wherein said expanded radial portion of said feed groove surface is aligned with said cross-bore surface circumferentially about said axis.

18. The bearing housing assembly as set forth in claim 1, wherein said constant radial portion of said feed groove surface is disposed circumferentially opposite to said cross-bore surface.

19. The bearing housing assembly as set forth in claim 1, wherein said constant radial portion of said feed groove surface is not aligned with said cross-bore surface circumferentially about said axis.

20. A turbocharger for delivering compressed air to an internal combustion engine including said bearing housing assembly of claim 1, said turbocharger comprising;
   a shaft disposed in said inner race of said bearing assembly and extending along said axis between a first shaft end portion and a second shaft end portion spaced from said first shaft end portion along said axis;
   a compressor wheel coupled to said first shaft end portion of said shaft; and
   a turbine wheel coupled to said second shaft end portion of said shaft.

* * * * *